US009318907B2

(12) United States Patent
Huang et al.

(10) Patent No.: US 9,318,907 B2
(45) Date of Patent: *Apr. 19, 2016

(54) ASSEMBLED WEARABLE ELECTRONIC DEVICE

(71) Applicant: COMPAL ELECTRONICS, INC., Taipei (TW)

(72) Inventors: Pei-Pin Huang, Taipei (TW); Chang-Hua Wei, Taipei (TW); Ting-Wei Wu, Taipei (TW); Pei-Jen Lin, Taipei (TW)

(73) Assignee: COMPAL ELECTRONICS, INC., Taipei (TW)

(*) Notice: Subject to any disclaimer, the term of this patent is extended or adjusted under 35 U.S.C. 154(b) by 6 days.

This patent is subject to a terminal disclaimer.

(21) Appl. No.: 14/267,910

(22) Filed: May 2, 2014

(65) Prior Publication Data

US 2015/0131216 A1 May 14, 2015

Related U.S. Application Data

(60) Provisional application No. 61/904,443, filed on Nov. 14, 2013.

(51) Int. Cl.
| | | |
|---|---|---|
| G06F 1/16 | (2006.01) | |
| H02J 7/00 | (2006.01) | |
| G04R 60/12 | (2013.01) | |
| H01Q 1/27 | (2006.01) | |
| G06F 3/01 | (2006.01) | |

(Continued)

(52) U.S. Cl.
CPC ............. *H02J 7/0045* (2013.01); *A44C 5/0007* (2013.01); *G04R 60/12* (2013.01); *G06F 1/163* (2013.01);

(Continued)

(58) Field of Classification Search
CPC ... H02J 7/0045; A44C 5/0007; G06F 1/1626; G06F 1/1654; G06F 3/014; G06F 1/163; G04R 60/12; H01Q 1/273; G04B 47/00; G04B 47/06
USPC ........... 361/679.03; 368/10, 11, 66, 281, 282, 368/294, 295, 296
See application file for complete search history.

(56) References Cited

U.S. PATENT DOCUMENTS 5,255,248 A * 10/1993 Goodmon ..................... 368/228
5,392,261 A * 2/1995 Hsu ............................... 368/281

(Continued)

FOREIGN PATENT DOCUMENTS

CN        103191557        7/2013

OTHER PUBLICATIONS

"Office Action of Taiwan Counterpart Application", issued on Dec. 16, 2015, pp. 1-8.

*Primary Examiner* — Hoa C Nguyen
*Assistant Examiner* — Sagar Shrestha
(74) *Attorney, Agent, or Firm* — Jianq Chyun IP Office

(57) ABSTRACT

An assembled wearable electronic device including a first body and a second body is provided. The first body has a primary system and a first assembling portion. The primary system is for providing the independent operation of the first body and producing a related first data. The second body has a secondary system and a second assembling portion. The secondary system is for providing the independent operation of the second body and producing a related second data. The first body and the second body are adapted to be assembled to each other by the first assembling portion and the second assembling portion, and the first assembling portion and the second assembling portion are adapted to rotate relatively such that the first assembling portion is positioned or released by the second assembling portion.

13 Claims, 9 Drawing Sheets

(51) Int. Cl.
*A44C 5/00* (2006.01)
*G06F 1/26* (2006.01)

(52) U.S. Cl.
CPC ............ *G06F 1/1613* (2013.01); *G06F 1/1626* (2013.01); *G06F 1/1654* (2013.01); *G06F 1/26* (2013.01); *G06F 3/014* (2013.01); *H01Q 1/273* (2013.01); *H02J 7/0044* (2013.01)

(56) References Cited

U.S. PATENT DOCUMENTS

| | | |
|---|---|---|
| 7,251,197 B2 * | 7/2007 | Yoshida et al. ................. 368/10 |
| 8,088,043 B2 | 1/2012 | Andren et al. |
| 2002/0085455 A1 * | 7/2002 | Haida ........................... 368/281 |
| 2008/0043575 A1 * | 2/2008 | Fasciano ........................ 368/13 |
| 2008/0074958 A1 * | 3/2008 | Moran ........................... 368/282 |
| 2008/0220871 A1 | 9/2008 | Asher et al. |
| 2009/0173760 A1 * | 7/2009 | Good ............................. 224/165 |
| 2009/0207701 A1 * | 8/2009 | Jacques ........................ 368/205 |
| 2011/0051561 A1 * | 3/2011 | Fujisawa ........................ 368/47 |
| 2012/0087216 A1 * | 4/2012 | Keung et al. ................. 368/282 |
| 2013/0095459 A1 * | 4/2013 | Tran .............................. 434/247 |
| 2013/0197680 A1 * | 8/2013 | Cobbett et al. .................. 700/91 |
| 2014/0334271 A1 * | 11/2014 | Park et al. ....................... 368/10 |
| 2014/0378794 A1 * | 12/2014 | Conrad et al. ................. 600/317 |

* cited by examiner

ASSEMBLED WEARABLE ELECTRONIC DEVICE

CROSS-REFERENCE TO RELATED APPLICATION

This application claims the priority benefits of U.S. provisional application Ser. No. 61/904,443, filed on Nov. 14, 2013. The entirety of the above-mentioned patent application is hereby incorporated by reference herein and made a part of this specification.

BACKGROUND OF THE INVENTION

1. Field of the Invention

The invention generally relates to an electronic device, and more particularly, to an assembled wearable electronic device.

2. Description of Related Art

In recent years, along with the prosperity and development of mobile communication technology, the function of a mobile communication device gets more and more versatile. In order to meet the market trend and the expectation of consumer, the assembled wearable electronic device such as a smart watch attracts the people gradually.

In general, a smart watch is composed of a first body (such as a portion of the watch body) and a second body (such as another portion of the watch body and a watch band). The first body is fixed at the second body, and the user wears the smart watch on the wrist thereof through the second body. In order to be compact and convenience for wearing, the appearance of a smart watch is also an important factor to affect the purchasing motivation of the consumers. However, the second body of the current smart watch is mostly not replaceable, which reduces the variety of the smart watch appearance and the purchasing motivation of the consumers.

SUMMARY OF THE INVENTION

Accordingly, the present invention is directed to an assembled wearable electronic device, wherein the second body is convenient to be replaced.

The assembled wearable electronic device includes a first body and a second body. The first body has a primary system and a first assembling portion. The primary system is for providing the independent operation of the first body and producing a related first data. The second body has a secondary system and a second assembling portion. The secondary system is for providing the independent operation of the second body and producing a related second data. The first body and the second body are adapted to be assembled to each other by the first assembling portion and the second assembling portion, and the first assembling portion and the second assembling portion are adapted to rotate relatively such that the first assembling portion is positioned or released by the second assembling portion.

According to an embodiment, one of the first assembling portion and the second assembling portion is an annular structure, and the other of the first assembling portion and the second assembling portion is adapted to be limited within the annular structure so that the first assembling portion and the second assembling portion are assembled to each other.

According to an embodiment, the assembled wearable electronic device further includes at least one elastic positioning member, wherein the elastic positioning member is disposed on one of the first assembling portion and the second assembling portion, the other of the first assembling portion and the second assembling portion has at least one positioning groove, and the first assembling portion and the second assembling portion are adapted to rotate relatively such that the elastic positioning member is aligned with and extends into the positioning groove.

According to an embodiment, one end of the positioning groove has a guide rail, and the elastic positioning member is adapted to move away from the positioning groove with the guide of the guide rail.

According to an embodiment, an extending direction of the guide rail inclines toward an axis, the first assembling portion is adapted to move toward the second assembling portion along a direction parallel to the axis to be assembled to the second assembling portion, and the first assembling portion and the second assembling portion are adapted to rotate relatively along the axis, such that the elastic positioning member moves along the guide rail.

According to an embodiment, one of the first assembling portion and the second assembling portion is an annular structure, and the other of the first assembling portion and the second assembling portion has a position limiting structure. The position limiting structure is adapted to be limited within the annular structure so that the first assembling portion and the second assembling portion are assembled to each other.

According to an embodiment, the annular structure has an opening, a size of the position limiting structure along a width direction is smaller than an inner diameter of the opening, so that the position limiting structure is adapted to go through the opening to be limited within the annular structure.

According to an embodiment, a size of the position limiting structure along a length direction is greater than an inner diameter of the opening. When the position limiting structure goes through the opening to be limited within the annular structure, the first assembling portion and the second assembling portion are adapted to rotate relatively such that two distal ends of the position limiting structure along the length direction is positioned on an inner wall of the annular structure.

According to an embodiment, the inner wall of the annular structure is in a concave cambered shape, and two distal ends of the position limiting structure along the length direction are in a convex cambered shape.

According to an embodiment, the first assembling portion has a toothing structure, and when the first assembling portion and the second assembling portion are assembled to each other, the toothing structure is adapted to be forced to drive the first assembling portion to rotate relative to the second assembling portion.

According to an embodiment, the primary system includes a primary control module, a primary power module, a primary memory module, a primary input module, a display module and a transferring module.

According to an embodiment, the secondary system includes a secondary control module, a secondary power module, a secondary memory module, a secondary input module and a detection module.

According to an embodiment, the detection module is a physiological detection module, an environmental detection module, a position detection module or a direction detection module.

Based on the above, in the assembled wearable electronic device, the first assembling portion of the first body and the second assembling portion of the second body are adapted to rotate relatively and position each other, and the first assembling portion and the second assembling portion are adapted to rotate relatively to release the positioning so that the first body and the second body are separated from each other. In this way, the user can conveniently combine the first body and the second body or separate the first body and the second body from each other to replace the second body, which is helpful to increase the variety of the appearance of the assembled wearable electronic device.

To make the above features and advantages of the invention more comprehensible, several embodiments accompanied with drawings are described in detail as follows.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1:
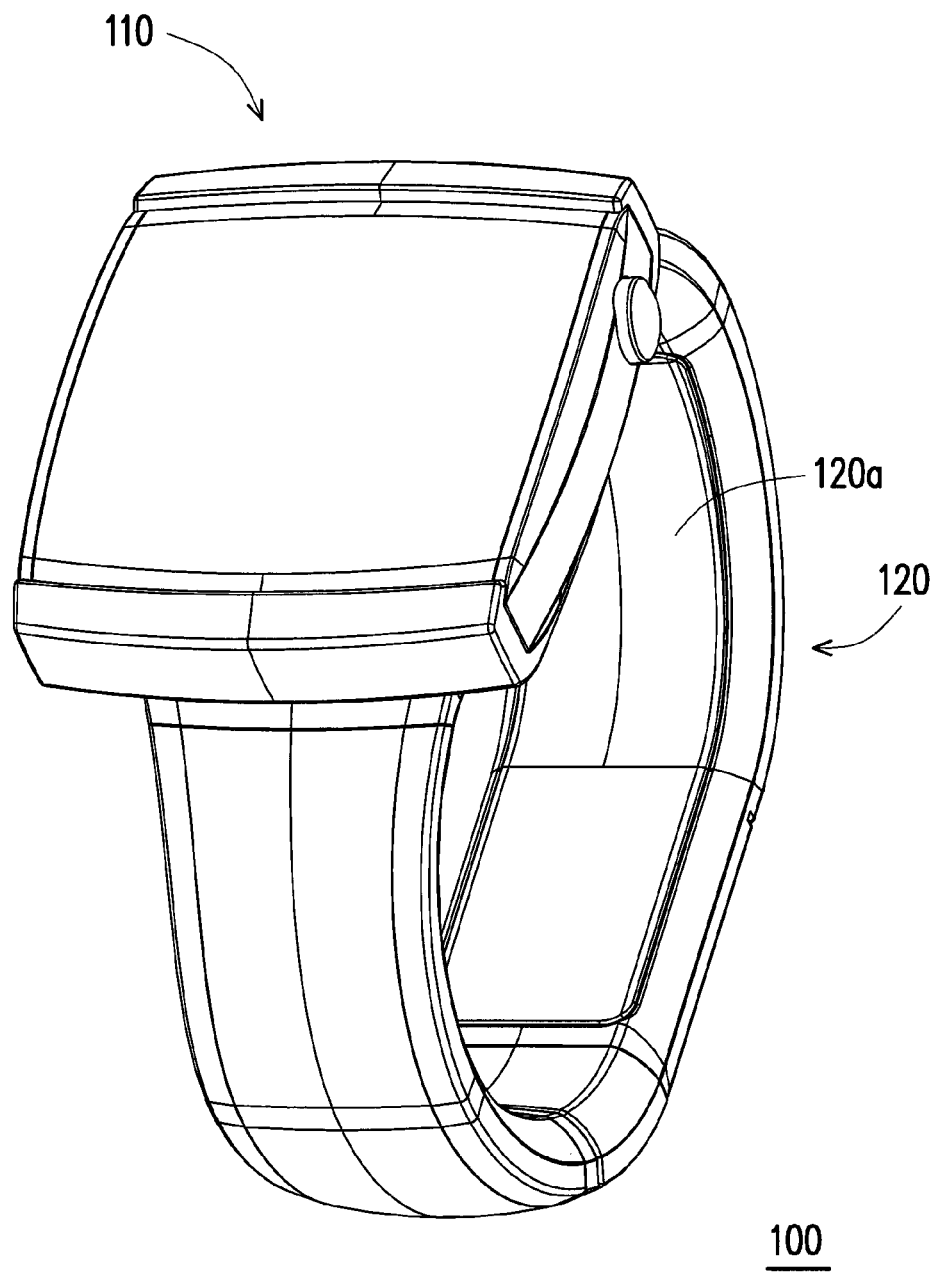
FIG. 1 is a perspective view of an assembled wearable electronic device according to an embodiment of the invention.
Figure 2:
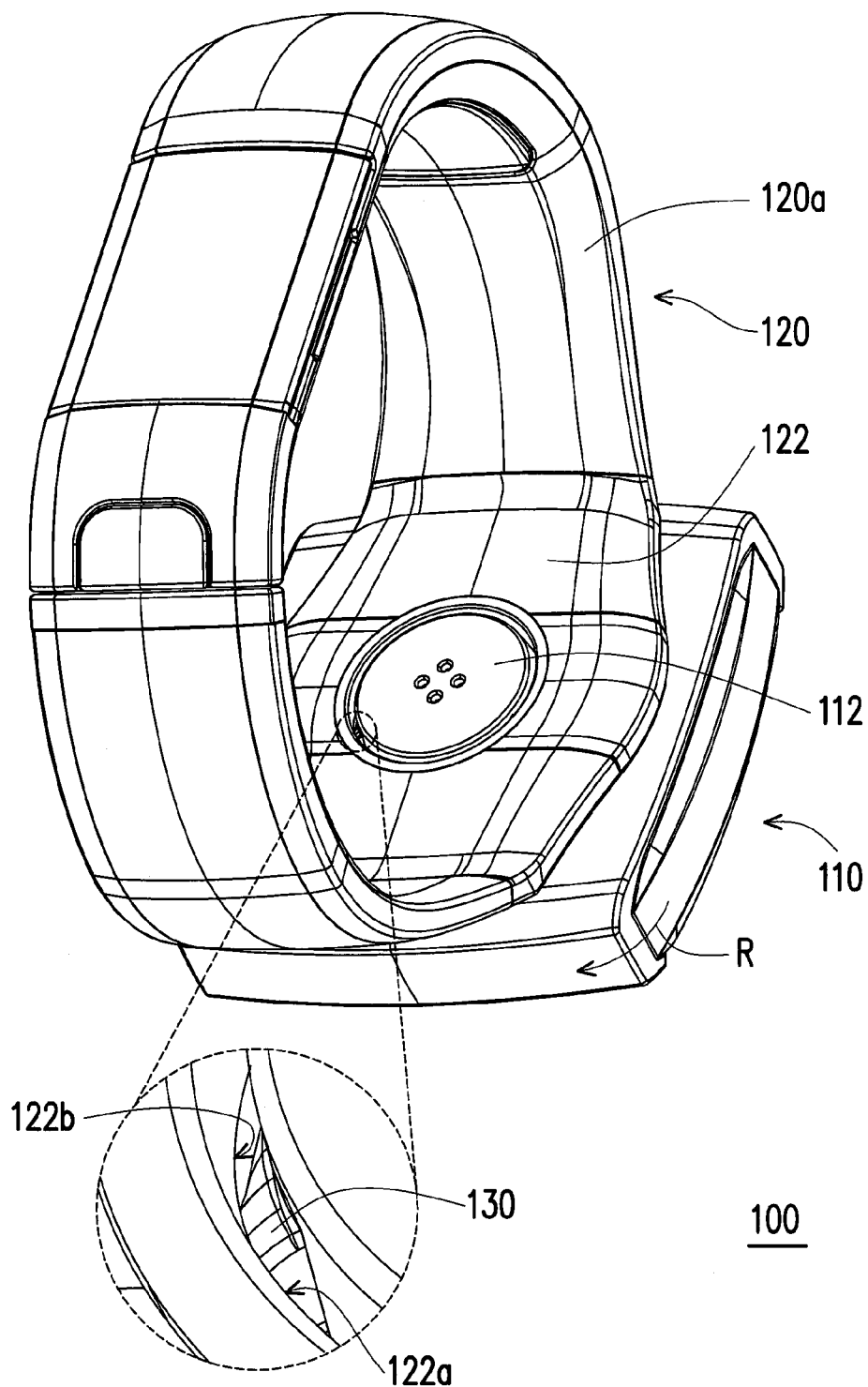
FIG. 2 is a perspective view of the assembled wearable electronic device of FIG. 1 from another angle.
Figure 3:
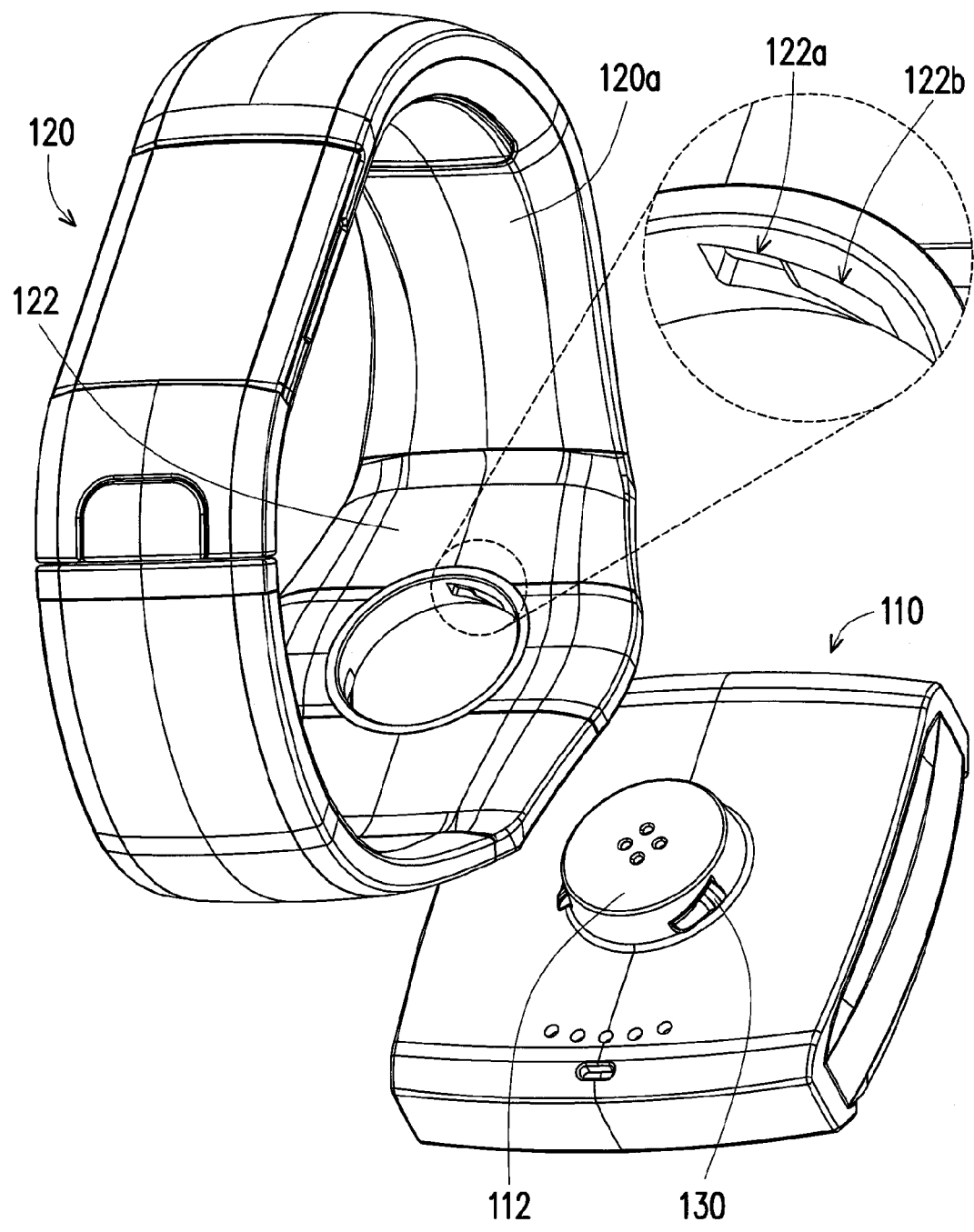
FIG. 3 is an explored diagram of the assembled wearable electronic device of FIG. 2.

FIG. 1 is a perspective view of an assembled wearable electronic device according to an embodiment of the invention. FIG. 2 is a perspective view of the assembled wearable electronic device of FIG. 1 from another angle. FIG. 3 is an explored diagram of the assembled wearable electronic device of FIG. 2. Referring to FIGS. 1-3, the assembled wearable electronic device 100 of the embodiment is, for example, a smart watch, and includes a first body 110 and a second body 120. The first body 110 is a portion of the watch body and has a primary system, and the primary system is for providing the independent operation of the first body 110 and producing a related first data. The second body 120 includes the other portion of the watch body and has a secondary system and a fixing member 120a, and the secondary system is for providing the independent operation of the second body 120 and producing a related second data. The fixing member 120a is, for example, a watch band, and the second body 120 is fixed at a fixed object (for example, the user's wrist) through the fixing member 120a.

In the embodiment, the aforementioned primary system of the first body 110, for example, includes a primary control module, a primary power module, a primary memory module, a primary input module, a display module and a transferring module. The aforementioned secondary system of the second body 120, for example, includes a secondary control module, a secondary power module, a secondary memory module, a secondary input module and a detection module. Moreover, the detection module is, for example, a physiological detection module, an environment detection module, a position detection module or a direction detection module.

The first body 110 has a first assembling portion 112, and the second body 120 has a second assembling portion 122. The first body 110 and the second body 120 are adapted to be assembled to each other as shown in FIGS. 1 and 2 via the first assembling portion 112 and the second assembling portion 122, and the first body 110 and the second body 120 are adapted to be separated from each other as shown in FIG. 3.

More specifically, the second assembling portion 122 of the embodiment is an annular structure, and the first assembling portion 112 is adapted to be limited within the annular structure so that the first assembling portion 112 and the second assembling portion 122 are assembled to each other. In other embodiments, the first assembling portion may also be designed to be an annular structure while the second assembling portion is not an annular structure and adapted to be limited within the annular structure. The invention is not limited thereto.

Figure 4:
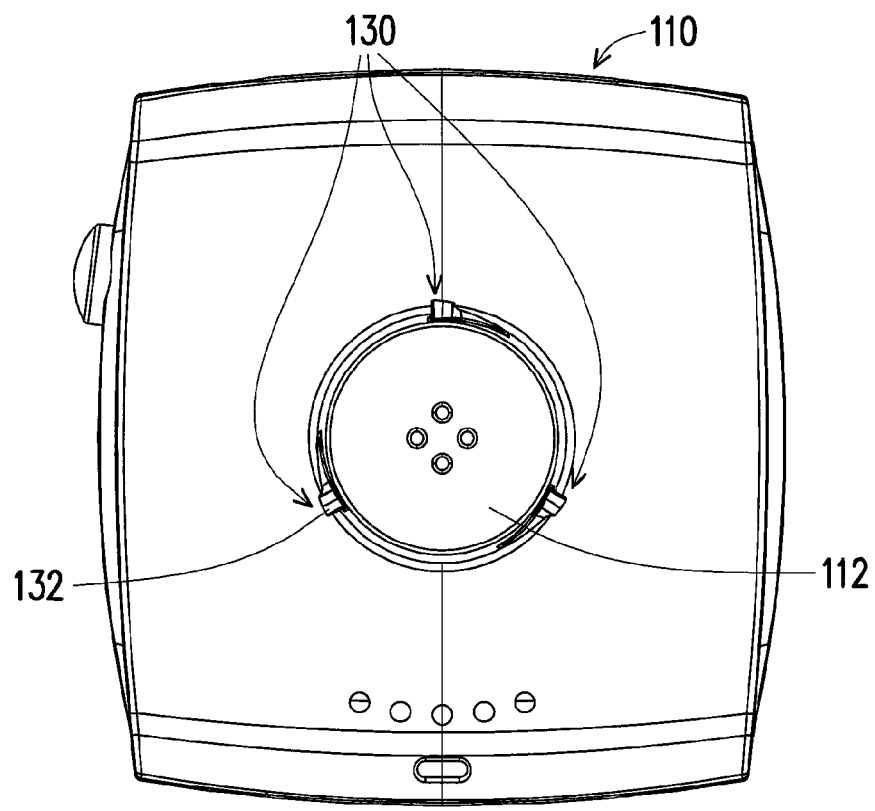
FIG. 4 is a bottom view of the first body in FIG. 1.
Figure 5:
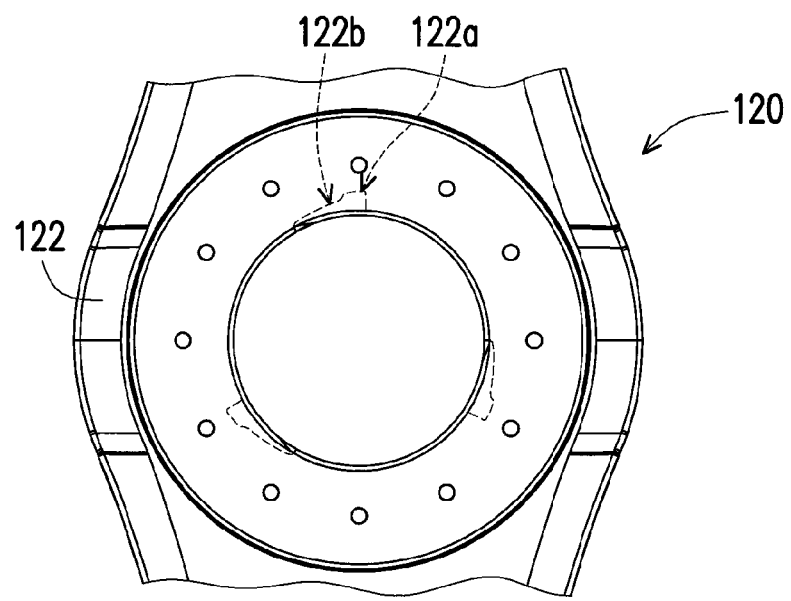
FIG. 5 is a partial top view of the second body in FIG. 1.

FIG. 4 is a bottom view of the first body in FIG. 1. FIG. 5 is a partial top view of the second body in FIG. 1. Referring to FIGS. 3-5, more specifically, the assembled wearable electronic device 100 of the embodiment includes at least one elastic positioning member 130 (FIG. 4 illustrates three such members). The elastic positioning members 130 are disposed on the first assembling portion 112 and are distributed evenly around the first assembling portion 112. The second assembling portion 122 has at least one positioning groove 122a (FIG. 5 illustrates three such grooves), and the positioning grooves 122a correspond respectively to the elastic positioning members 130.

When the user intends to assemble the first body 110 and the second body 120, the first assembling portion 112 is inserted into the second assembling portion 122, and force is applied to the first body 110 so that the first assembling portion 112 and the second assembling portion 122 rotate relatively to drive the elastic positioning members 130 to be aligned with and extend into the positioning grooves 122a (as shown in the enlarged zone in FIG. 2), such that the first assembling portion 112 is positioned by the second assembling portion 122. When the user intends to separate the first body 110 as shown in FIG. 1 from the second body 120, force is applied to the first body 110 to drive each of the elastic positioning members 130 to move away from the corresponding positioning groove 122a with the relative rotation of the first assembling portion 112 and the second assembling portion 122, so that the first assembling portion 112 is released by the second assembling portion 122. Thus, the user can easily combine the first body 110 and the second body 120 or separate the first body 110 from the second body 120 to replace the second body 120, which is helpful to increase the variety of the appearance of the assembled wearable electronic device 100.

The elastic positioning member 130 of the embodiment is, for example, formed by a latching member 132 as shown in FIG. 4 and a spring (not shown) connected between the latching member 132 and the first assembling portion 112. When each of the latching members 132 is aligned with the corresponding positioning groove 122a along with the relative rotation of the first assembling portion 112 and the second assembling portion 122, each of the latching members 132 extends into the corresponding positioning groove 122a via the elastic force of the spring. In other embodiments, the elastic positioning member may be an integrally formed metal elastic piece or other adequate forms. In addition, the elastic positioning member may also be disposed on the second assembling portion, while the positioning groove is formed on the first assembling portion. The invention is not limited thereto.

Referring to FIGS. 2 and 3, in the embodiment, an end of each of the positioning grooves 122a of the second assembling member 122 has a guide rail 122b. When the user rotates the first body 110 along a direction R (marked in FIG. 2), each of the elastic positioning members 130 disposed on the first assembling portion 112 is moved away from the corresponding positioning groove 122a with the guide of the corresponding guide rail 122b, so that the first assembling portion 112 is released by the second assembling portion 122.

Figure 6:
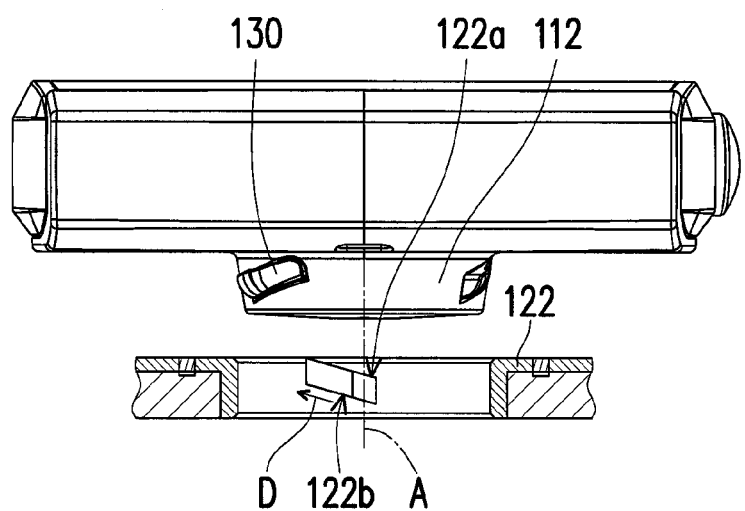
FIG. 6 is an explored diagram of the first assembling portion and the second assembling portion in FIG. 2.

FIG. 6 is an explored diagram of the first assembling portion and the second assembling portion in FIG. 2. To make the drawing clearer, the second assembling portion 122 in FIG. 6 is illustrated as a section view. Referring to FIG. 6, more particularly, the first assembling portion 112 is adapted to move along a direction parallel to an axis A toward the second assembling portion 122 to be assembled to the second assembling portion 122, and the first assembling portion 112 and the second assembling portion 122 are adapted to rotate relatively along the axis A so that the elastic positioning member 130 moves along the guide rail 122b, while an extending direction D of the guide rail 122b inclines toward the axis A. By means of such a design, when the first assembling portion 122 rotates along the axis A so that the elastic positioning member 130 moves along the guide rail 122b until being disengaged from the positioning groove 122a and the guide rail 122b, the first assembling portion 112 moves upwards with the way that the guide rail 122b guides the elastic positioning member 130 and is gradually disengaged from the second assembling portion 122, such that the user is able to separate the first assembling portion 112 and the second assembling portion 122.

Figure 7:
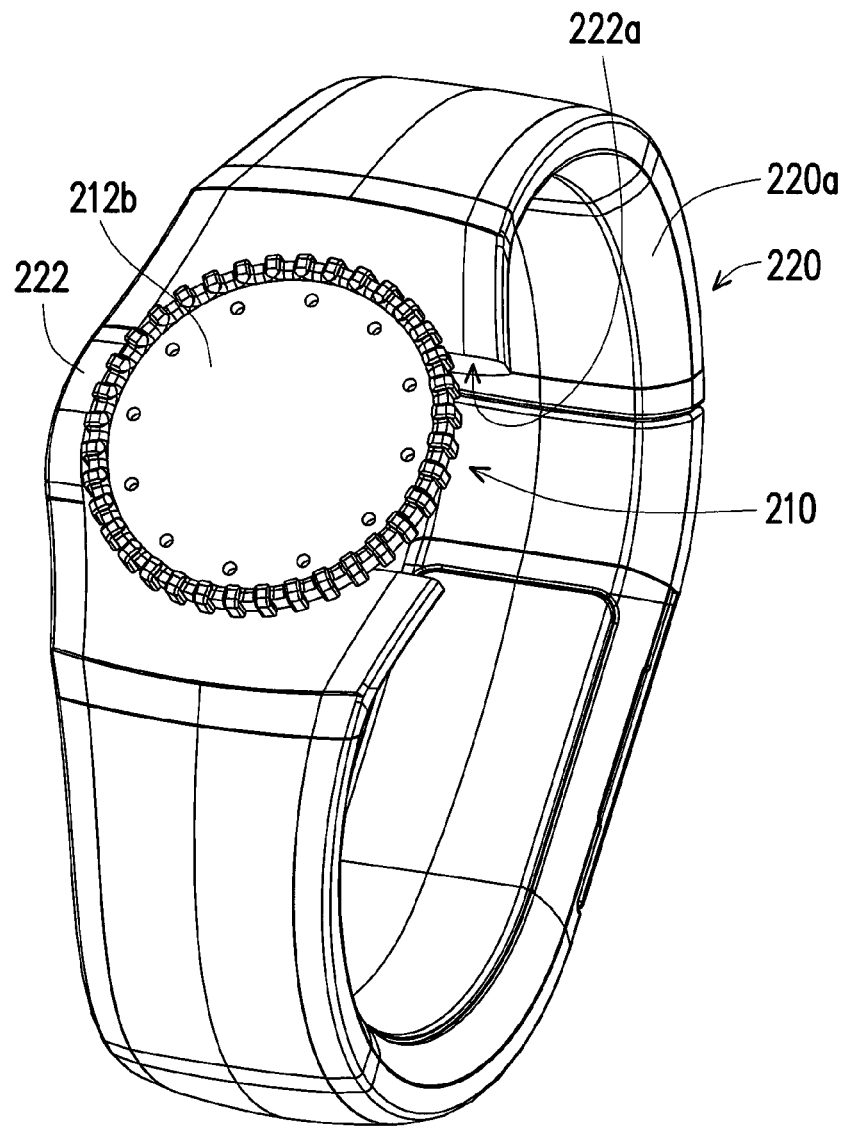
FIG. 7 is a perspective view of an assembled wearable electronic device according to another embodiment of the invention.
Figure 8:
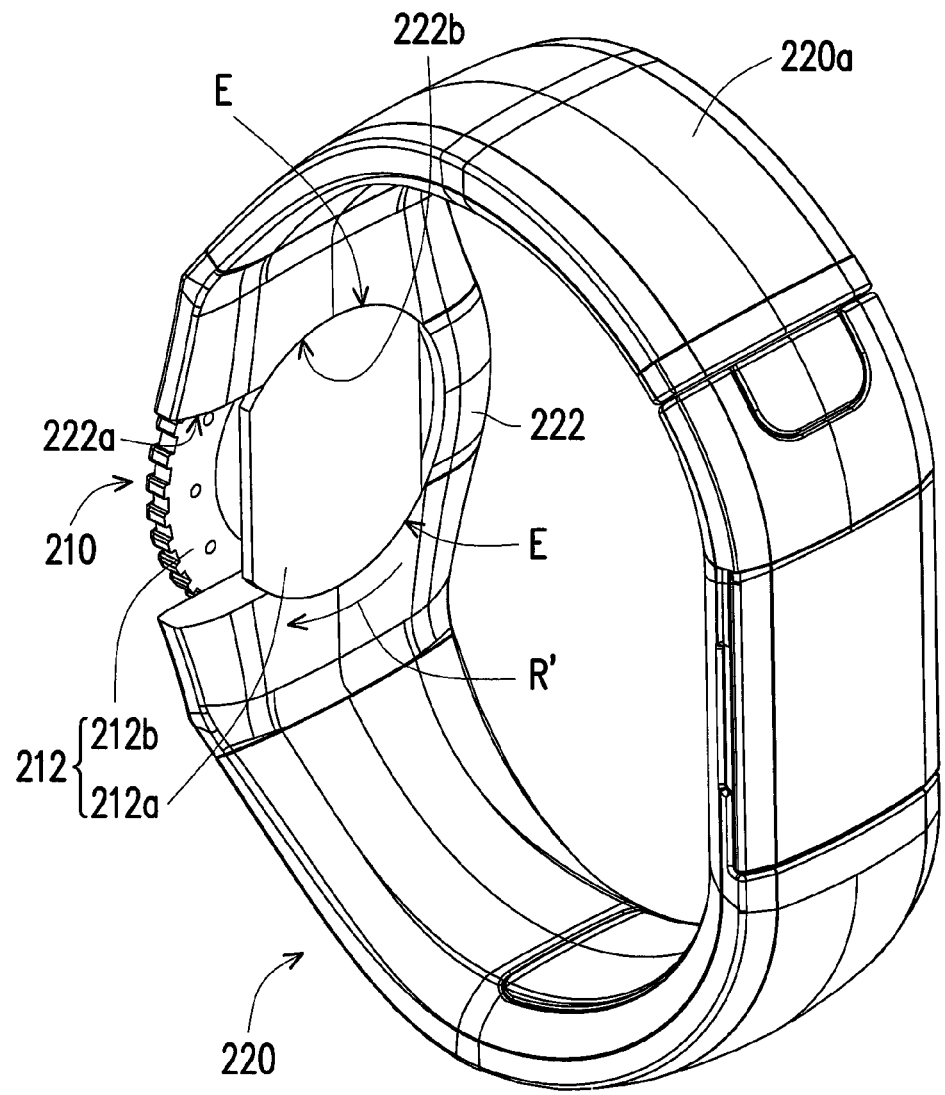
FIG. 8 is a perspective view of the assembled wearable electronic device of FIG. 7 from another angle.

FIG. 7 is a perspective view of an assembled wearable electronic device according to another embodiment of the invention. FIG. 8 is a perspective view of the assembled wearable electronic device of FIG. 7 from another angle. To make the drawings clearer, merely partial structures of a first body 210 in FIGS. 7 and 8 are illustrated. Referring to FIGS. 7-8, the assembled wearable electronic device 200 is, for example, a smart watch, and includes the first body 210 and a second body 220. The first body 210 is a portion of the watch body and has a primary system, and the primary system is for providing the independent operation of the first body 210 and producing a related first data. The second body 220 includes the other portion of the watch body and has a secondary system and a fixing member 220a, and the secondary system is for providing the independent operation of the second body 220 and producing a related second data. The fixing member 220a is, for example, a watch band, and the second body 220 is fixed at a fixed object (for example, the user's wrist) through the fixing member 220a.

In the embodiment, the aforementioned primary system of the first body 210, for example, includes a primary control module, a primary power module, a primary memory module, a primary input module, a display module and a transferring module. The aforementioned secondary system of the second body 220, for example, includes a secondary control module, a secondary power module, a secondary memory module, a secondary input module and a detection module. Moreover, the detection module is, for example, a physiological detection module, an environment detection module, a position detection module or a direction detection module.

In the embodiment, when the second body 220 is independently operated, the secondary control module makes the data produced by the detection module, the input module or other secondary system during independent operation stored into the secondary memory module to serve as a second data (for example, a heartbeat data for the physiological detection module to produce during detecting the physiological of the user). Then, when the first body 210 and the second body 220 are connected to each other, the second data of the second body 220 is read through the operation of the primary control module of the first body 210. At the time, the second data, for example the heartbeat data, is transferred to other electronic devices or to a cloud storage database through a transferring module of the primary system (for example, a Bluetooth communications module) for further storage or analysis.

The first body 210 has a first assembling portion 212. The second body 220 has a second assembling portion 222. The first body 210 and the second body 220 are adapted to be assembled to each other via the first assembling portion 212 and the second assembling portion 222, as shown in FIGS. 7 and 8.

More specifically, the second assembling portion 222 of the embodiment is an annular structure, and the first assembling portion 212 has a position limiting structure 212a. The position limiting structure 212a is adapted to be limited within the annular structure so that the first assembling portion 212 and the second assembling portion 222 are assembled to each other. In other embodiments, the first assembling portion may also be designed to be an annular structure, while the second assembling portion is designed to have a position limiting structure which is limited within the annular structure. The invention is not limited thereto.

Figure 9A:
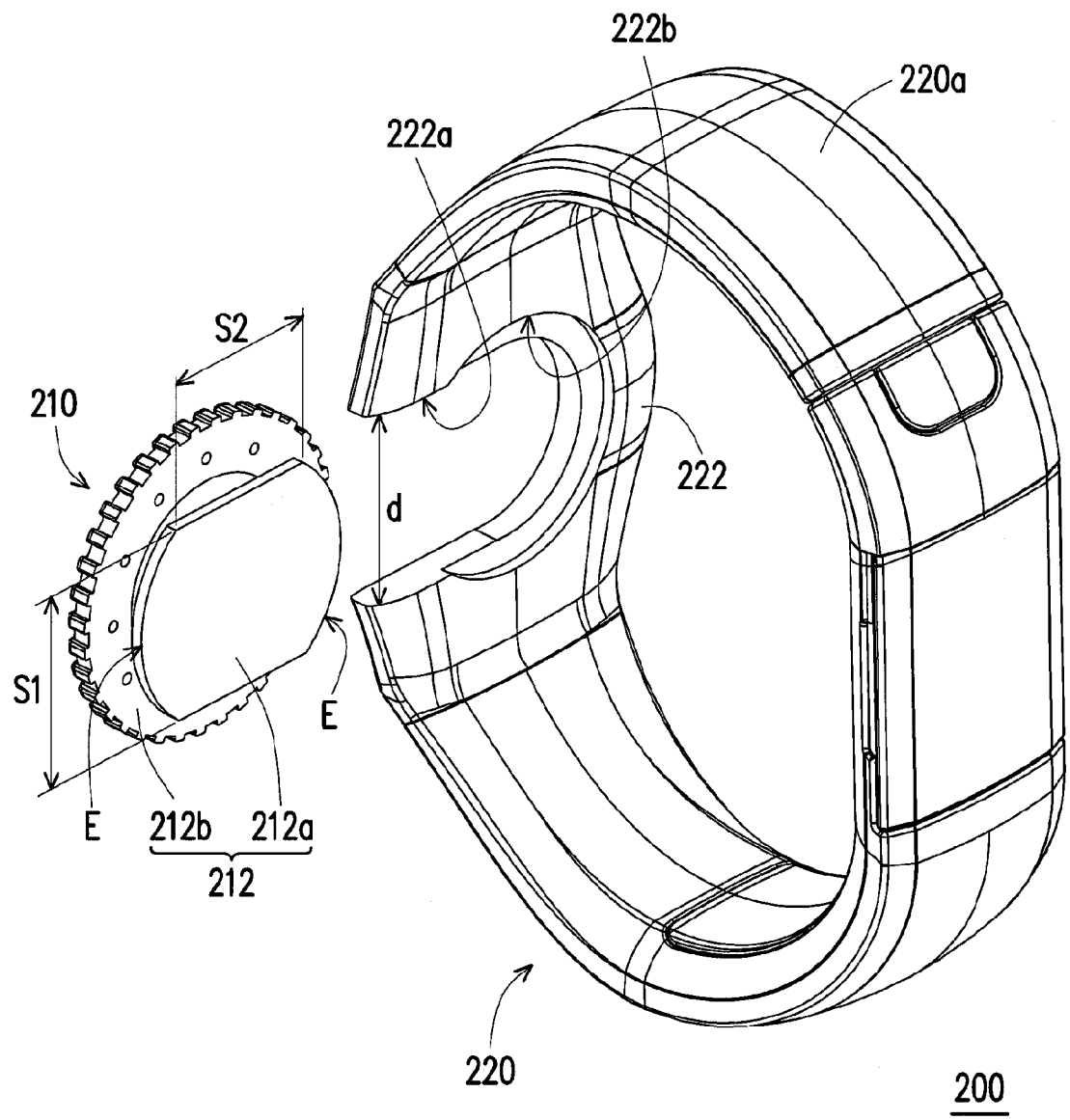
FIGS. 9A and 9B illustrate the way that the assembled wearable electronic device of FIG. 7 is assembled.
Figure 9B:
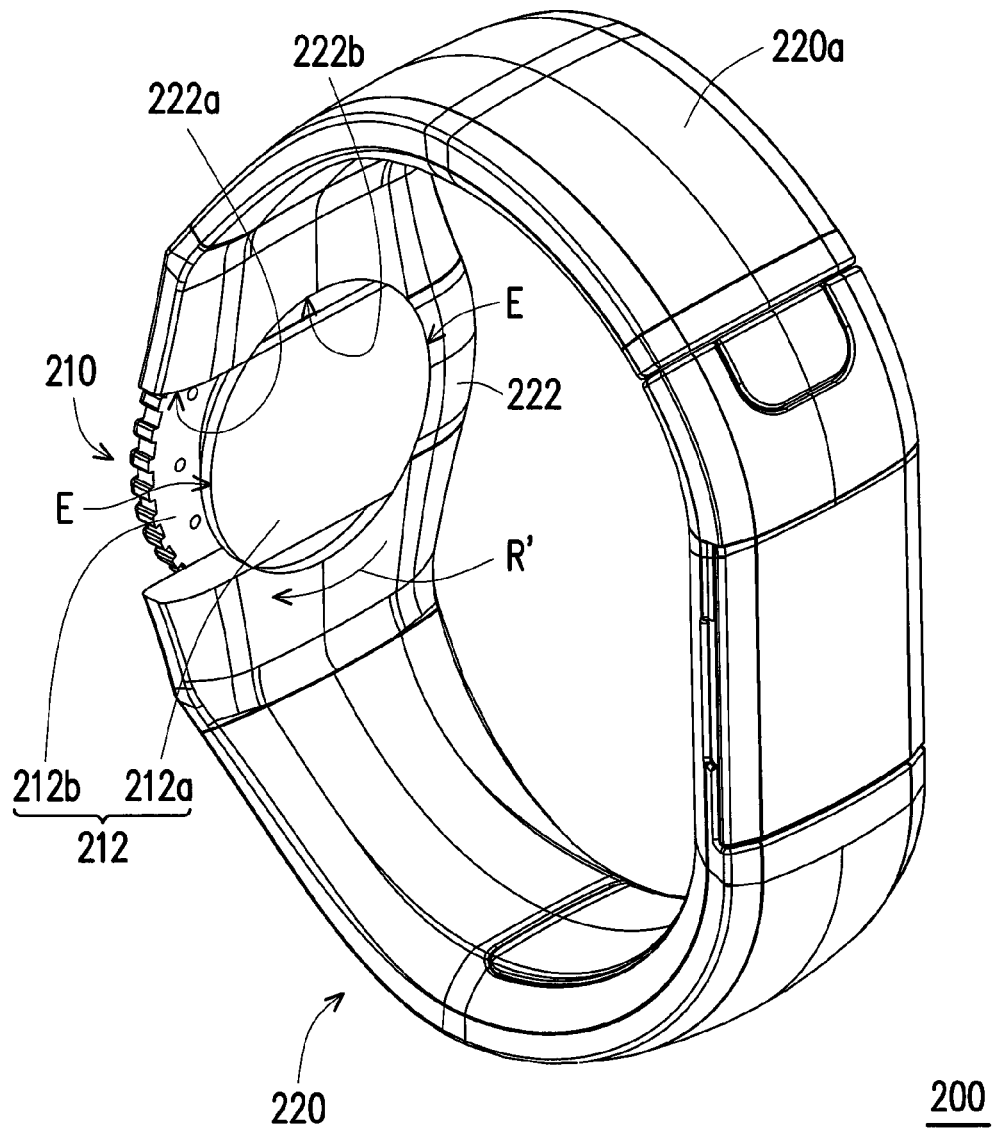

FIGS. 9A and 9B illustrate the way that the assembled wearable electronic device of FIG. 7 is assembled. More specifically, the annular structure (namely the second assembling portion 222) has an opening 222a, and a size S1 (marked in FIG. 9A) along a width direction of the position limiting structure 212a of the first assembling portion 212 is smaller than an inner diameter d (marked in FIG. 9A) of the opening 222a, so that the position limiting structure 212a is adapted to go through the opening 222a to be limited within the annular structure (namely the second assembling portion 222) as shown in FIGS. 9A-9B.

More specifically, an inner wall 222b of the annular structure (namely the second assembling portion 222) is in a concave cambered shape, and two distal ends E of the position limiting structure 212a along a length direction thereof are in convex cambered shape. In addition, a size S2 of the position limiting structure 212a along the length direction thereof is greater than the inner diameter d of the opening 222a. When the position limiting structure 212a goes through the opening 222a to be limited within the annular structure (namely the second assembling portion 222) as shown in FIG. 9B, the user is able to apply force to the first body 210 to drive the first assembling portion 212 and the second assembling portion 222 to rotate relatively along a direction R', so that the position limiting structure 212a is positioned on the inner wall 222b of the annular structure (namely the second assembling portion 222) along the two distal ends E in the length direction of the position limiting structure 212a, and the position limiting structure 212a is prevented from going through the opening 222a and being disengaged from the second assembling portion 222.

In the embodiment, the first assembling portion 212 has a toothing structure 212b, and the toothing structure 212b is for the user to apply force so as to rotate the first body 210. More specifically, when the first assembling portion 212 and the second assembling portion 222 are assembled to each other in the state as shown in FIG. 8, the toothing structure 212b is adapted to be forced to drive the first assembling portion 212 to rotate relative to the second assembling portion 222 to the state as shown in FIG. 9B, so that the first assembling portion 212 is released by the second assembling portion 222. Similarly, when the first assembling portion 212 and the second assembling portion 222 are assembled to each other in the state as shown in FIG. 9B, the toothing structure 212b is adapted to be forced to drive the first assembling portion 212 to rotate relative to the second assembling portion 222 to the state as shown in FIG. 8, so that the first assembling portion 212 is positioned by the second assembling portion 222.

In light of the above, in the assembled wearable electronic device, the first assembling portion of the first body and the second assembling portion of the second body are adapted to rotate relatively and position each other, and the first assembling portion and the second assembling portion are adapted to rotate relatively to release the positioning so that the first body and the second body is separated from each other. In this way, the user can conveniently combine the first body and the second body or separate the first body and the second body from each other to replace the second body, which is helpful to increase the variety of the appearance of the assembled wearable electronic device.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An assembled wearable electronic device, comprising:
   a first body, having a primary system and a first assembling portion, wherein the primary system is for providing the independent operation of the first body and producing a related first data;
   a second body, having a secondary system and a second assembling portion, wherein the secondary system is for providing the independent operation of the second body and producing a related second data, the first body and the second body are adapted to be assembled to each other by the first assembling portion and the second assembling portion, and the first assembling portion and the second assembling portion are adapted to rotate relatively such that the first assembling portion is positioned or released by the second assembling portion; and
   at least one positioning member, disposed on one of the first assembling portion and the second assembling portion, wherein the other of the first assembling portion and the second assembling portion has at least one positioning groove, and the first assembling portion and the second assembling portion are adapted to rotate relatively to drive the positioning member to be aligned with and extend into the positioning groove, such that the first assembling portion is positioned by the second assembling portion.

2. The assembled wearable electronic device of claim 1, wherein one of the first assembling portion and the second assembling portion is an annular structure, and the other of the first assembling portion and the second assembling portion is adapted to be limited within the annular structure so that the first assembling portion and the second assembling portion are assembled to each other.

3. The assembled wearable electronic device of claim 1, wherein the at least one positioning member is an elastic positioning member.

4. The assembled wearable electronic device of claim 3, wherein one end of the positioning groove has a guide rail, and the elastic positioning member is adapted to move away from the positioning groove with the guide of the guide rail.

5. The assembled wearable electronic device of claim 4, wherein an extending direction of the guide rail inclines toward an axis, the first assembling portion is adapted to move toward the second assembling portion along a direction parallel to the axis to be assembled to the second assembling portion, and the first assembling portion and the second assembling portion are adapted to rotate relatively along the axis, such that the elastic positioning member moves along the guide rail.

6. The assembled wearable electronic device of claim 1, wherein one of the first assembling portion and the second assembling portion is an annular structure, and the other of the first assembling portion and the second assembling portion has a position limiting structure, the position limiting structure being adapted to be limited within the annular structure so that the first assembling portion and the second assembling portion are assembled to each other.

7. The assembled wearable electronic device of claim 6, wherein the annular structure has an opening, a size of the position limiting structure along a width direction is smaller than an inner diameter of the opening, so that the position limiting structure is adapted to go through the opening to be limited within the annular structure.

8. The assembled wearable electronic device of claim 7, wherein a size of the position limiting structure along a length direction is greater than the inner diameter of the opening, and when the position limiting structure goes through the opening to be limited within the annular structure, the first assembling portion and the second assembling portion are adapted to rotate relatively such that two distal ends of the position limiting structure along the length direction is positioned on an inner wall of the annular structure.

9. The assembled wearable electronic device of claim 8, wherein the inner wall of the annular structure is in a concave cambered shape, and the two distal ends of the position limiting structure along the length direction are in convex cambered shape.

10. The assembled wearable electronic device of claim 1, wherein the first assembling portion has a toothing structure, and when the first assembling portion and the second assembling portion are assembled to each other, the toothing structure is adapted to be forced to drive the first assembling portion to rotate relative to the second assembling portion.

11. The assembled wearable electronic device of claim 1, wherein the primary system comprises a primary control module, a primary power module, a primary memory module, a primary input module, a display module and a transferring module.

12. The assembled wearable electronic device of claim 1, wherein the secondary system comprises a secondary control module, a secondary power module, a secondary memory module, a secondary input module and a detection module.

13. The assembled wearable electronic device of claim 12, wherein the detection module is a physiological detection module, an environmental detection module, a position detection module or a direction detection module.

* * * * *